June 18, 1940.  H. DÄHLING  2,204,982
ELECTROLYTIC WATER DECOMPOSER
Filed Sept. 18, 1936  2 Sheets-Sheet 2

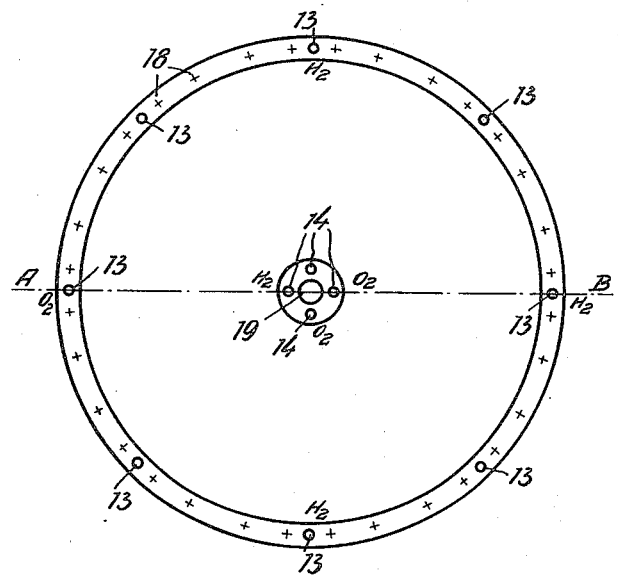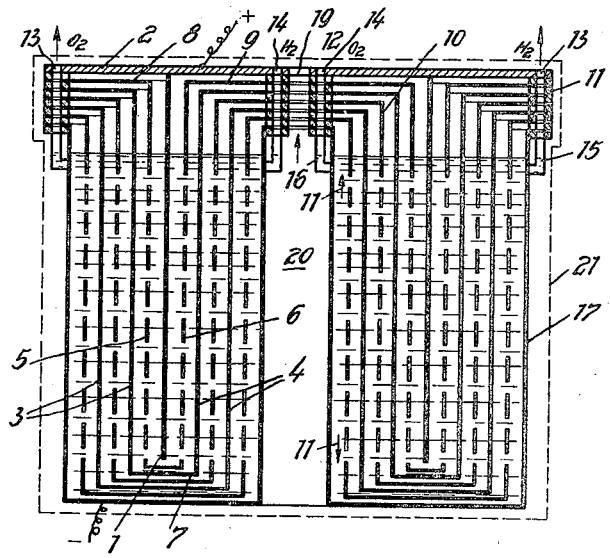

Inventor
Heinz Dähling
by Knight Bros
Attorneys

Patented June 18, 1940

2,204,982

UNITED STATES PATENT OFFICE 2,204,982

ELECTROLYTIC WATER DECOMPOSER

Heinz Dähling, Berlin-Haselhorst, Germany, assignor to Siemens & Halske, Aktiengesellschaft, Siemensstadt, near Berlin, Germany, a corporation of Germany Application September 18, 1936, Serial No. 101,390
In Germany September 30, 1935

5 Claims. (Cl. 204—5)

My invention relates to improvements in electrolytic water decomposers having concentrically arranged electrodes.

In the electrolytic water decomposers hitherto employed the provision of a sufficiently reliable seal between the individual cells below the electrolyte level and in the case of concentrically arranged electrodes the compensation of the considerable difference in the heating of the electrolyte in the individual electrode chambers due to the different current densities present great difficulties. In the case of the concentrically arranged electrodes hitherto employed the current density and, therefore, the heating up of the electrolyte in the known water decomposers is considerably greater in the electrode chambers lying inside than in those lying outside the hollow cylindrical sheet iron electrode.

The invention relates to a fundamentally novel design of an electrolytic water decomposer having concentrically arranged electrodes in which the above-mentioned difficulties are completely removed. Seals below the electrolyte level may be entirely dispensed with in the water decomposer according to the invention and the current density may be uniformly distributed without any difficulty over all parts of the effective electrode surfaces.

These advantages are attained according to the invention by arranging electrodes in bipolar connection inside and outside a preferably hollow cylinder electrode in unipolar connection. In this case every two electrodes in bipolar connection and equally spaced from the electrode in unipolar connection at both sides of the latter are conductively connected to each other to form an electrode unit. Further, it is preferable to give the electrodes in bipolar connection the form of two hollow bodies, preferably hollow cylinders of different diameters, which are conductively connected with each other by a bottom plate. The sum of the diameters of these electrodes in bipolar connection is in this case equal to twice the diameter of the electrode in unipolar connection. By the insertion of diaphragms of equal height it is possible to uniformly distribute the current density over all electrodes.

An embodiment of my invention is illustrated by way of example in the accompanying drawings, in which Fig. 1 shows a top view of the apparatus and Fig. 2 a vertical sectional view taken on the line A—B of Fig. 1.

Figure 3:
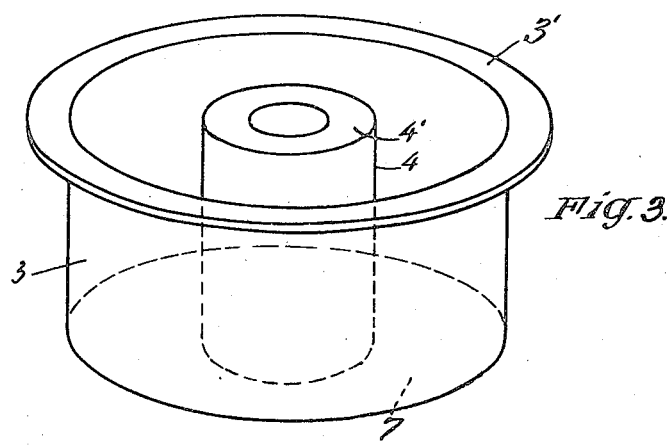

Fig. 3 illustrates the form of the bipolar electrodes.

According to Figs. 1 and 2 a hollow cylindrical electrode 1 is welded with its upper edge to a circular cover 2 of metal. Outside and inside the hollow cylindrical electrode 1 are concentrically arranged hollow cylindrical sheet iron electrode elements 3 and 4 respectively and therebetween are arranged diaphragms 5 and 6. The diameters of the hollow sheet iron electrode cylinders 4 lying within the electrode 1 are successively as much smaller than the diameter of the electrode 1, as the diameters of the correspondingly positioned hollow sheet iron electrode cylinders lying outside the electrode 1 are successively greater than the diameter of electrode 1, i. e. the sum of the diameters of each pair of the electrode cylinders 3 and 4 equidistant from electrode 1 is equal to two times the diameter of electrode 1. Each pair of electrode cylinders 3 and 4, equidistant from electrode 1, and forming a bipolar electrode unit, is connected at its lower ends by means of an electrically conducting bottom 7, whereas the upper ends of each pair are provided with respectively outwardly and inwardly turned horizontal circular flanges 3' and 4'. The form of such an electrode unit is illustrated separately in Fig. 3. Such units, when telescoped into one another and spaced apart as shown in Fig. 2, will form bipolar electrode surfaces with respect to the adjacent electrode surfaces, which alternate in polarity toward electrode 1 when for instance, as shown in Fig. 2, the minus pole of the current source is connected to the outermost electrode, in this case the outer casing 17, and the plus pole to the inner, single pole cylindrical electrode 1.

Figure 4:
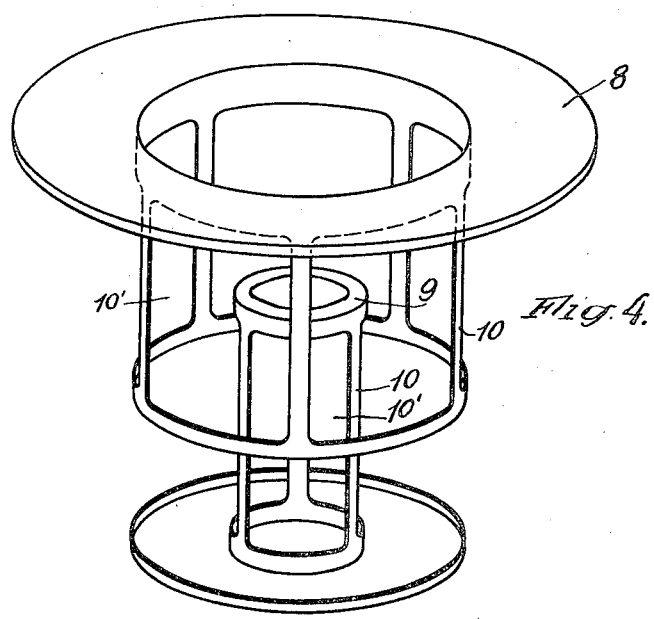

The diaphragms 5, 6, interposed between electrode surfaces of opposite polarity, are secured in flanged cylindrical frames 10 which are in form substantially similar to the forms of the electrode cylinder pairs into which they are alternately telescoped, so that a bipolar electrode cylinder alternates with a diaphragm cylinder. A pair of such frames is shown separately in Fig. 4. Each pair of frames 10, 10 is provided in its cylindrical surfaces with large windows 10' over which the diaphragm material 5, 6 is spread. The windows of all pairs of telescoped frames are of the same height as is indicated between the arrows 11 in Fig. 2, and they register in radial direction.

The supports 10 for the diaphragms 5, 6 are made of solid material which is impermeable to liquid. Since the electrode surface portions directly opposite the nonpermeable portions of supports 10 must be considered electrolytically practically ineffective, the effect is attained by the aforementioned windows 10' that, notwithstanding the graduated different axial lengths of the several electrode cylinders themselves, each electrode unit—composed of an outer and an inner annulus 3, 4 respectively, equally spaced with respect to electrode 1—has a similar size effective electrode surface for the electrolysis, and therefore all electrode units are equally loaded, and can be utilized to their full capacity.

The flanges 8 and 9 are arranged one upon the other and insulated from one another by insulating material 12, 12, and serve as supports for the individual electrodes. The stack of flanges is covered by cover plate 2 which closes the cell. The flanges 8 and 9 and the cover plate 2 as well as the seals 12, 12 arranged therebetween are provided with holes 13 and 14 forming together vertical passages communicating with the particular individual U-shaped spaces between the electrodes, so as to separately carry off the gases developed therein. The passages 13 and 14 are connected to conduits 15, 16 entering the outer or inner electrode space and serving to return to the electrolyte the electrolyte particles entrained by the gases in the electrode space. As will be apparent from Fig. 1 quite a number of gas outlets 13 and 14 may be provided both for the inner flanges 9 and for the outer flanges 8 in order to carry off the gases in an easier and quicker manner.

The novel electrolytic water decomposer may be employed for low-pressure as well as for high-pressure operation. In the case of a low-pressure operation a particular outer container may be dispensed with by amply dimensioning the outermost electrode whose surface is only partly utilized. The current supply is effected in this case preferably in the manner that the one pole of the power source, preferably the negative pole, is connected to the outermost electrode 17 and the other pole to the cover plate 2. The threaded bolts 18 denoted by crosses in Fig. 1 and passing through the flanges 8 may be employed to supply current to the cover plate 2. Through the aperture 19 extending through the inner flanges 9 it is possible in this case to carry off the air heated during the operation from the inner hollow chamber 20, thus preventing the heat from accumulating therein.

However, if desired, the novel water decomposer may also be easily suspended in another container and the cooling may be effected by liquid, preferably the electrolyte itself, contained in the outer container.

In the case of high-pressure operation a strong container is further required as indicated at 21 in Fig. 2 by the dotted lines. This container encloses the water decomposer and has correspondingly thick walls.

Both for low-pressure and high-pressure operation it is possible to design so to say tower-like decomposers in a simple manner by arranging several decomposers one upon the other. The cover plate 2 of the lower decomposer is then conductively connected to the bottom plate 17 of the next higher decomposer, and the current need only be supplied to the cover plate 2 of the uppermost decomposer and to the outer electrode 17 of the lowest decomposer. In order to supply current to the outer electrode of the lowest decomposer, for instance, ordinary channel bars may be employed on which the bottom surface of the outer electrode 17 of the lowest decomposer rests. This supply of current with the aid of bars placed beneath the decomposer may also be advantageously employed for decomposers consisting of a single unit, i. e., for the embodiment shown in Fig. 2. If the cooling by dissipating the heat from the inner space 20 and from the outer side of the outer electrode 17 should not be sufficient, it is possible to attain in the decomposer according to the invention an intense cooling effect in a simple manner by designing several of the or, if desired, also all electrodes with double walls and to circulate cooling liquid between these double walls.

The application of the invention is not limited to the use of hollow cylindrical electrodes, but it may also be applied to electrodes having an elliptical or angular form.

The electrolyte may be supplied to the spaces between the electrodes through some of the passages 13 or 14. In the case of low pressure it is sufficient to apply a comparatively slight excess pressure in order to supply through these passages the electrolyte to the individual electrode chambers which are connected in groups to apertures leading to the passages 14. By the telescopic arrangement of the individual electrodes as shown particularly in Figs. 2 and 3 besides avoiding the seals below the electrolyte level as well as a non-uniform distribution of the current density also the advantage is attained that the decomposer may be easily manufactured and assembled, so that if it is desired to transport the complete decomposer this may be easily done. If the individual cylindrical sheet-iron electrodes should be particularly well secured in position spacers consisting of insulating material may be inserted between the individual flanges 8 and 9 as well as between the bottom plates 7.

I claim as my invention:

1. An electrolytic water decomposer having a tubular central electrode and a plurality of concentric pairs of radially spaced tubular electrode elements, one pair nested into the annular space formed by the other pair and in spaced relation thereto, each pair having its two component elements electrically connected and located respectively externally and internally of said central electrode at an equal radial distance therefrom, means for passing current radially from said tubular central electrode through said electrode pairs so as to render the component elements of each pair bipolar electrodes and of similar external and similar internal polarity, said means having conductors of different polarity connected with said central electrode and with the electrode pair including the outermost tubular element respectively, and diaphragms spaced between successive internal and external electrode elements.

2. An electrolytic water decomposer having a tubular central electrode and a plurality of concentric pairs of radially spaced tubular electrode elements, one pair nested into the annular space formed by the other pair and in spaced relation thereto, each pair having its two component elements electrically connected and located respectively externally and internally of said central electrode at an equal radial distance therefrom, means for passing current radially from said tubular central electrode through said electrode pairs so as to render the component elements of each pair bipolar electrodes and of similar external and similar internal polarity, said means having conductors of different polarity connected with said central electrode and with the electrode pair including the outermost tubular element respectively, and diaphragms of uniform axial length spaced between successive internal and external electrode elements.

3. An electrolytic water decomposer having a tubular central electrode and a plurality of concentric pairs of radially spaced tubular electrode elements, one pair nested into the annular space formed by the other pair and in spaced relation thereto, each pair having a conducting annular bottom electrically connecting the component tubular pair elements and having said tubular elements located respectively externally and internally of said central electrode at an equal radial distance therefrom, means for passing current radially from said tubular central electrode through said electrode pairs so as to render the component elements of each pair bipolar electrodes and of similar external and similar internal polarity, said means having conductors of different polarity connected with said central electrode and with the electrode pair including the outermost tubular element respectively, and diaphragms of uniform axial length spaced between successive internal and external electrode elements.

4. An electrolytic water decomposer having a tubular central electrode and a plurality of concentric pairs of radially spaced tubular electrode elements, one pair nested into the annular space formed by the other pair and in spaced relation thereto, each pair having a conducting annular bottom electrically connecting the component tubular pair elements and having said tubular elements located respectively externally and internally of said central electrode at an equal radial distance therefrom, means for passing current radially from said tubular central electrode through said electrode pairs so as to render the component elements of each pair bipolar electrodes and of similar external and similar internal polarity, said means having conductors of different polarity connected with said central electrode and with the electrode pair including the outermost tubular element respectively, diaphragms of uniform axial length spaced between successive internal and external electrode elements, each of said internal and external electrode elements having respectively an inwardly and an outwardly extending annular flange of sufficient diameter to permit all of said internal and external elements to respectively rest one upon the other, and spacing insulators between said several annular flange elements to secure their relative positions, said diaphragms having similarly shaped flanges alternating with said electrode flanges, each of said electrode and diaphragm flanges having a plurality of openings arranged to register with similarly disposed openings of the other flanges to form substantially axially directed passages for discharging the several gaseous decomposition products from the spaces between adjacent diaphragms and electrode elements.

5. An electrolytic water decomposer having a tubular central electrode and a plurality of concentric pairs of radially spaced tubular electrode elements, one pair nested into the annular space formed by the other pair and in spaced relation thereto, each pair having its two component elements electrically connected and located respectively externally and internally of said central electrode at an equal radial distance therefrom, means for passing current radially from said tubular central electrode through said electrode pairs so as to render the component elements of each pair bipolar electrodes and of similar external and similar internal polarity, said means having conductors of different polarity connected with said central electrode and with the electrode pair including the outermost tubular element respectively, and diaphragms spaced between successive internal and external electrode elements, the inner tubular element of the outermost electrode pair forming a tubular passage open at both ends, permitting ventilating air to pass through the interior of the decomposer.

HEINZ DÄHLING.